Jan. 20, 1931.　　　　H. H. HILL　　　　1,789,406
BAKING OVEN
Filed May 12, 1930　　　2 Sheets-Sheet 2

Inventor:
Harold H. Hill.
by
Charles N. Gooding, Atty

Patented Jan. 20, 1931

1,789,406

UNITED STATES PATENT OFFICE

HAROLD H. HILL, OF BOSTON, MASSACHUSETTS

BAKING OVEN

Application filed May 12, 1930. Serial No. 451,573.

This invention relates to a baker's oven.

The object of the invention is to provide an oven embodying efficient means for evenly and economically baking articles which are placed therein.

To these ends the novel feature and construction of the oven consists in positioning a row of fire-proof blocks along the opposite sides of the oven floor, or deck, said blocks being placed in spaces between the opposite edges of the oven floor and the adjacent walls of the casing of the oven. Said blocks as well as the floor are made of fire-proof material, such as terra cotta or clay, and the said blocks are provided with flues, some of which extend entirely through the blocks and others extend only part way through the blocks. The purpose of closing the flues of some of the blocks is to confine the heated air within the blocks while other currents of heated air are passing up through other blocks. The blocks which extend above the floor of the oven being made of terra cotta or other suitable fire-proof material will not cause the food in the baking pans to be burned or scorched when the side of the pan is in contact with these blocks.

The invention consists in a baking oven of the character hereinafter set forth and particularly of the construction set forth in the claims.

Referring to the drawings.

Like numerals refer to like parts throughout the several views of the drawings.

Figure 1:
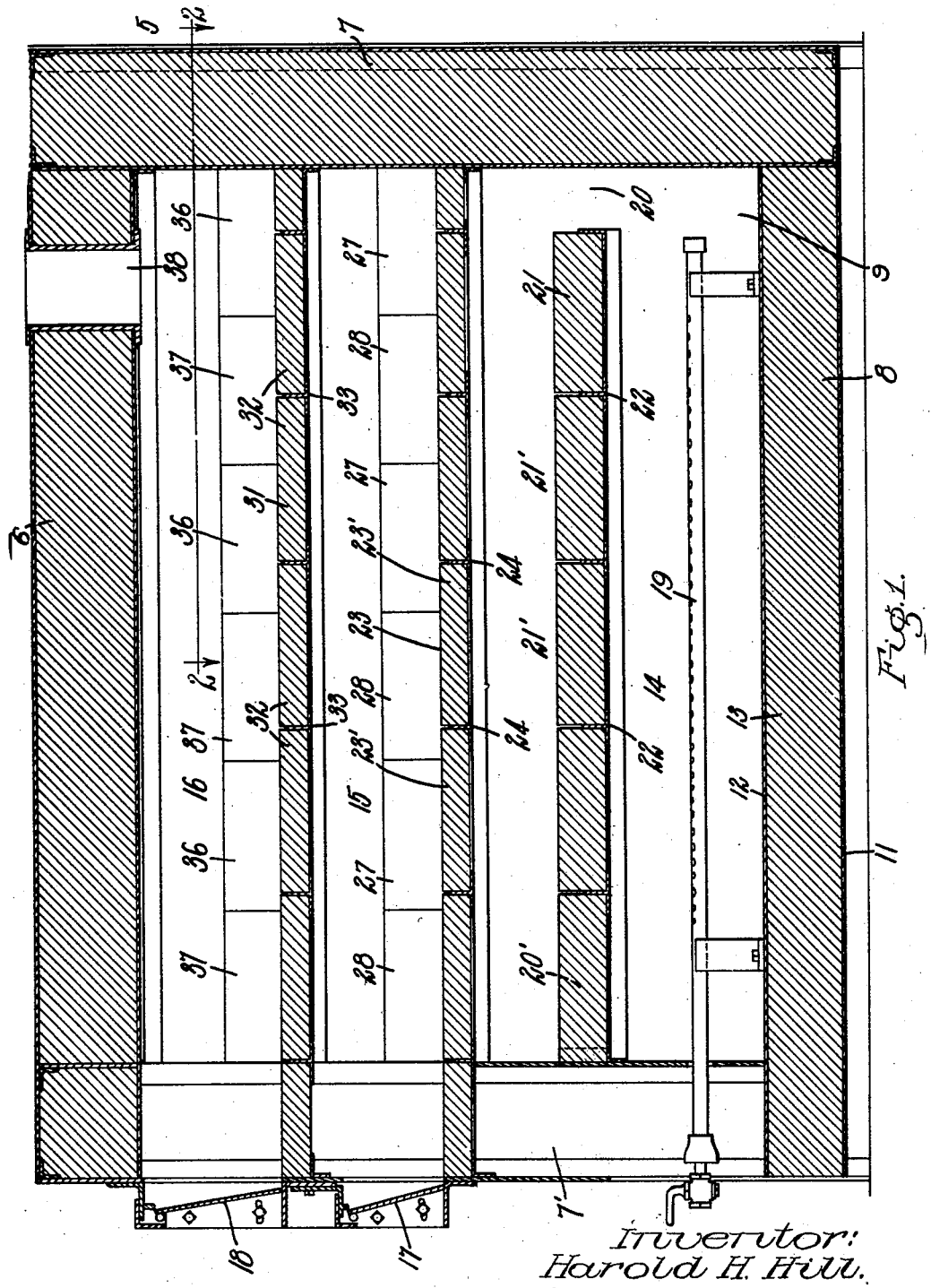
Fig. 1 is a vertical longitudinal section of my improved baking oven.
Figure 2:
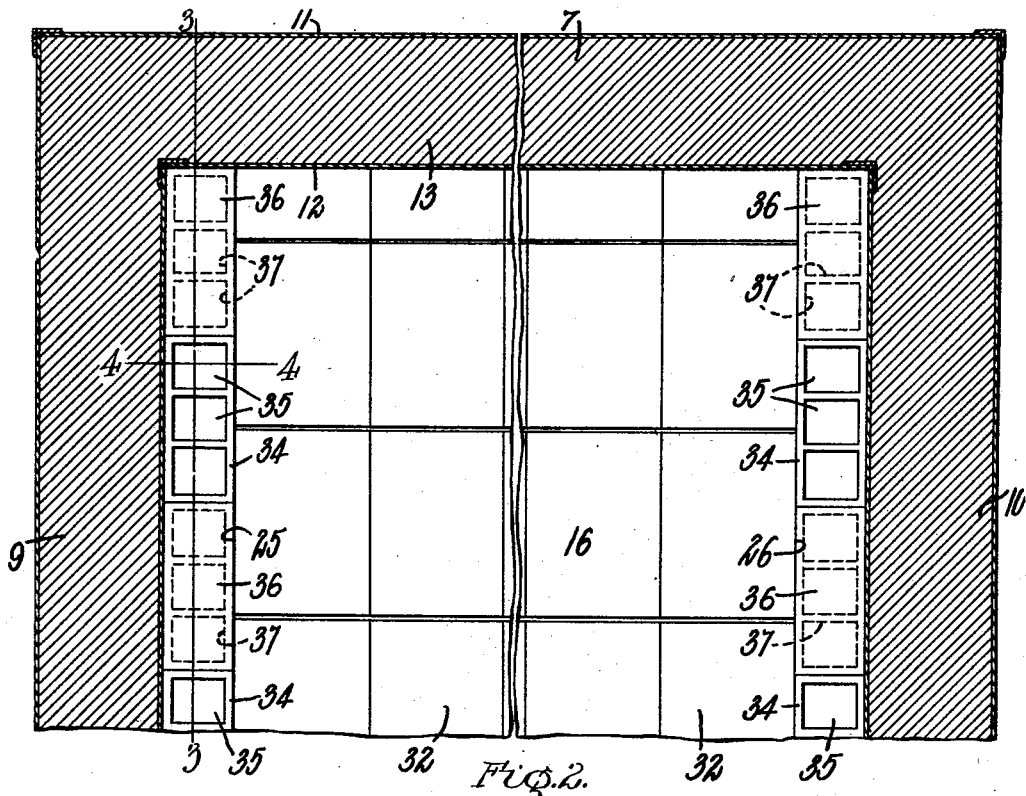
Fig. 2 is a sectional plan of a portion of the oven taken on the line 2—2 of Fig. 1.
Figure 3:
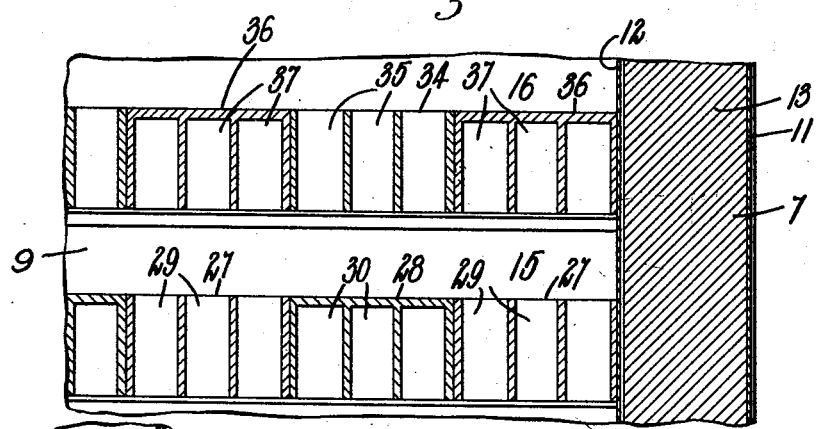
Fig. 3 is a vertical sectional elevation taken on line 3—3, Fig. 2.
Figure 4:
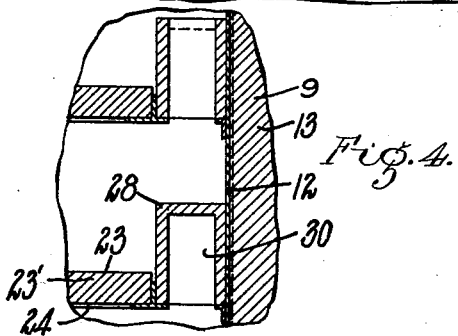
Fig. 4 is a detail vertical sectional elevation taken on line 4—4, Fig. 2.

In the drawings, 5 is the casing of the oven consisting of a top 6, a rear wall 7, a front wall 7', a bottom 8 and two side walls 9 and 10. These walls and the bottom of the oven are built in the usual manner and consist preferably of sheet metal plates 11 on the outside of the casing and sheet metal plates 12 on the inside of the casing, while in between the plates 11 and 12 is interposed insulating material 13 of any suitable character. It is evident that any suitable material other than sheet metal might be utilized for the plates 11 and 12. The interior of the casing is provided with a heat compartment 14 and two baking compartments 15 and 16. A door 17 opens into the compartment 15 and a door 18 opens into the compartment 16, these doors being pivotally mounted at the top to the casing of the oven.

Heat is supplied to the oven by a burner 19. Any suitable style of burner and fuel being used. The heated air and products of combustion in the heat compartment 14 pass upwardly through a passage 20 between the rear wall 7 of the casing and a partition 21 of fire-proof material, constituting a baffle. Passages 20' are also provided between the side walls 9 and 10 and the sides of said partition 21. The partition 21 preferably consists of a plurality of fire-proof blocks or tiles 21", which are supported on T-iron supports 22 extending from one side of the oven to the other.

The baking compartment 15 is located immediately above the heat compartment 14 and consists of a deck or floor 23 formed of blocks or tiles 23' of fire-proof material, which are supported upon cross T pieces 24 extending from one side of the oven to the other. The opposite sides of the floor 23 are spaced apart from the sides 9 and 10 of the oven by spaces 25 and 26 respectively. These spaces have positioned therein and extending upwardly above the floor 23 a series of hollow blocks 27 and 28 of fire-proof material, such as terra cotta. The blocks 27 each have a passage 29 extending vertically therethrough. The blocks 28 each have a vertical chamber 30 therein closed at its upper end. The blocks 27 are preferably constructed with three vertical flues therein open at their upper ends. The blocks 28 are preferably constructed with three vertical chambers 30 therein closed at their upper ends.

The baking compartment 16 is provided with a floor 31, similar to the floor 23, consisting of tiles or blocks 32 of fire-proof material, which are supported by cross T pieces

33 extending from one side of the oven to the other. The floor 31 is spaced apart at its opposite sides from the opposite sides 9 and 10 of the oven casing the same as the floor 23 is spaced apart from said opposite sides, and the spaces between the opposite sides of the floor 31 and the walls of the casing are provided with blocks 34 having vertical passages 35 extending therethrough and with vertical blocks 36 having vertical chambers 37 therein which are closed at their upper ends. The blocks 34 and 36 are made of fire-proof material such as terra cotta and are positioned in the spaces adjacent the opposite sides of the floor 31. The blocks 34 having flues passing vertically therethrough are positioned vertically in alignment with the blocks 28 having closed vertical chambers therein, and the blocks 36 having closed vertical chambers therein are positioned in vertical alignment with the blocks 27 having vertical flues extending therethrough.

The air and products of combustion from the heat chamber 14 pass upwardly therefrom through the flues 29 in the blocks 27 and into the chambers 30, which are closed at their upper ends, in the blocks 28. As the air passes upwardly through the flues 29, it will fill the chambers 37 on the second floor and will be diverted to pass upwardly through the passages 35 in the blocks 34. After the heated air has passed through the passages 35, it will pass through the chamber 16 and upwardly through an outlet flue 38 in the top 6 of the oven. The heated air being retained in the chambers 30 of the lower compartment 15 and in the chambers 37 of the upper compartment 16 adds to the heating and efficiency of the two compartments 15 and 16, and the terra cotta blocks 27 and 28 which project up above the floor 23 and the terra cotta blocks 34 and 36 which project above the floor of the compartment 16 not only diffuse and radiate heat to their respective compartments, but also prevent the pans in which the food to be baked is placed from coming into contact with any metal used in the construction of the inner face of said casing in which event the heated metal would overheat the pans in which the material to be baked is located and cause the material being baked to be burned or scorched.

In lieu of the burner 19 a firebox for coal or wood might be used, in which case a suitable smoke flue would be provided to carry the smoke arising from the combustion of such fuel and the noxious gases arising therefrom through said heating compartment and upward through the oven chamber or chambers and thence to the open air so as to prevent the said smoke and noxious gases from coming into contact with the products placed in the chamber or chambers to be baked. Air surrounding the fire box and the said flue would be heated thereby and this heated air would be utilized in the process of baking the goods placed in the chambers above the heating compartment.

I claim:

1. A baking oven having, in combination, a casing, a baking compartment therein comprising a floor of fire-proof material spaced apart on its opposite sides from the walls of said casing, blocks of fire-proof material with flues extending vertically therethrough positioned along sides of said floor in alignment with the spaces between the edges of the floor and said walls, and other blocks of material with vertical chambers closed at their upper ends and positioned between said first-named blocks.

2. A baking oven having, in combination, a casing, baking compartments therein comprising a pair of floors of fire-proof material positioned one above the other and each of said floors spaced apart on its opposite sides from the walls of said casing, blocks of fire-proof material with flues extending vertically therethrough, and other blocks of fire-proof material with vertical chambers closed at their upper ends, all of said blocks of fire-proof material being positioned along sides of said floors in alignment with the spaces between the edges of the floors and said walls.

3. A baking oven having, in combination, a casing, baking compartments therein comprising a pair of floors of fire-proof material positioned one above the other and each of said floors spaced apart on its opposite sides from the walls of said casing, blocks of fire-proof material with flues extending vertically therethrough, and other blocks of fire-proof material with vertical chambers closed at their upper ends, all of said blocks of fire-proof material being positioned along sides of said floors in alignment with the spaces between the edges of the floors and said walls, the blocks of material with vertical chambers closed at their upper ends being positioned between the other blocks of fire-proof material with vertical flues extending therethrough, and the blocks of material with flues extending therethrough on the first of said floors being in vertical alignment with the blocks of material with chambers closed at their upper ends on the second of said floors, and vice versa.

4. A baking oven having, in combination, a casing, baking compartments therein comprising a pair of floors positioned one above the other and each of said floors spaced apart on its opposite sides from the walls of said casing, blocks with flues extending vertically therethrough, and other blocks with vertical chambers closed at their upper ends, all of said blocks being positioned along sides of said floors in alignment with the spaces between the edges of the floors and said walls and terminating at their upper ends within said compartments.

5. A baking oven having, in combination, a casing, baking compartments therein comprising a pair of floors positioned one above the other and each of said floors spaced apart on its opposte sides from the walls of said casing, blocks with flues extending vertically therethrough, and other blocks with vertical chambers closed at their upper ends, all of said blocks being positioned along sides of said floors in alignment with the spaces between the edges of the floors and said walls, the blocks with vertical chambers closed at their upper ends being positioned between the other blocks with vertical flues extending therethrough, and the blocks with flues extending therethrough on the first of said floors being in vertical alignment with the blocks with chambers closed at their upper ends on the second of said floors, and vice versa, all of said blocks terminating at their upper ends within said compartments.

In testimony whereof I have hereunto set my hand.

HAROLD H. HILL.